(12) United States Patent
Syrcle et al.

(10) Patent No.: US 11,007,960 B1
(45) Date of Patent: May 18, 2021

(54) RESTRAINT SYSTEMS AND RESTRAINT SYSTEM METHODS

(71) Applicant: Advanced Concepts in Manufacturing LLC, Spokane Valley, WA (US)

(72) Inventors: Mike Syrcle, Spokane Valley, WA (US); Eric Wellington, Liberty Lake, WA (US)

(73) Assignee: Advanced Concepts in Manufacturing LLC, Spokane Valley, WA (US)

(*) Notice: Subject to any disclaimer, the term of this patent is extended or adjusted under 35 U.S.C. 154(b) by 471 days.

(21) Appl. No.: 15/916,094

(22) Filed: Mar. 8, 2018

Related U.S. Application Data

(60) Provisional application No. 62/485,169, filed on Apr. 13, 2017.

(51) Int. Cl.
| | |
|---|---|
| B60R 21/02 | (2006.01) |
| F15B 15/14 | (2006.01) |
| F15B 15/06 | (2006.01) |
| F15B 13/02 | (2006.01) |
| F15B 13/044 | (2006.01) |
| A63G 31/00 | (2006.01) |
| B60R 21/00 | (2006.01) |
| F15B 13/04 | (2006.01) |

(52) U.S. Cl.
CPC .............. *B60R 21/02* (2013.01); *A63G 31/00* (2013.01); *F15B 13/027* (2013.01); *F15B 13/044* (2013.01); *F15B 15/06* (2013.01); *F15B 15/1433* (2013.01); *F15B 15/1442* (2013.01); *B60R 2021/0097* (2013.01); *F15B 2013/0409* (2013.01); *F15B 2211/30505* (2013.01)

(58) Field of Classification Search
CPC ............................................... B60R 2021/0097
See application file for complete search history.

(56) References Cited

U.S. PATENT DOCUMENTS

| | | | | |
|---|---|---|---|---|
| 2,872,901 A | * | 2/1959 | Goldring | B25C 1/042 91/417 R |
| 3,633,966 A | * | 1/1972 | Epple | F16F 5/00 297/470 |
| 3,889,969 A | * | 6/1975 | Otani | F16F 7/125 297/470 |
| 4,005,877 A | * | 2/1977 | Humphries | B60R 21/02 280/748 |
| 4,531,459 A | * | 7/1985 | Yamada | A63G 7/00 104/53 |
| 5,060,932 A | * | 10/1991 | Yamaguchi | G09B 9/323 472/47 |
| 5,529,382 A | * | 6/1996 | Burkat | B60R 21/02 297/487 |

(Continued)

*Primary Examiner* — Nicole T Verley
(74) *Attorney, Agent, or Firm* — Wells St. John P.S.

(57) ABSTRACT

Passenger restraint systems are provided. The restraint systems can include: a passenger seat supported by a frame; a restraint bar pivotably attached to the frame; and at least one piston operably engaged between the restraint bar and the frame. Restraint system pistons are provided. The pistons can include: a central chamber housing a piston head and rod; a fluid reservoir in fluid communication with the central chamber; and at least one electromechanical valve operable between an open and a closed position. Methods for restraining a passenger within a seat are also provided.

7 Claims, 19 Drawing Sheets

(56) References Cited

U.S. PATENT DOCUMENTS

| | | | | |
|---|---|---|---|---|
| 6,637,341 | B2* | 10/2003 | Kroon | A63G 27/04 |
| | | | | 104/53 |
| 8,132,514 | B2* | 3/2012 | Lubman | B60R 21/02 |
| | | | | 104/241 |
| 8,157,067 | B2* | 4/2012 | Ruthinowski | B60N 2/2887 |
| | | | | 188/372 |
| 9,914,428 | B2* | 3/2018 | Zamperla | B60R 21/01512 |
| 10,569,731 | B2* | 2/2020 | Thiele | B60R 22/12 |
| 2019/0184935 | A1* | 6/2019 | Blum | B60R 21/02 |
| 2020/0180556 | A1* | 6/2020 | Bruno | B60R 22/48 |
| 2020/0298783 | A1* | 9/2020 | Zurcher | B60N 2/503 |

* cited by examiner

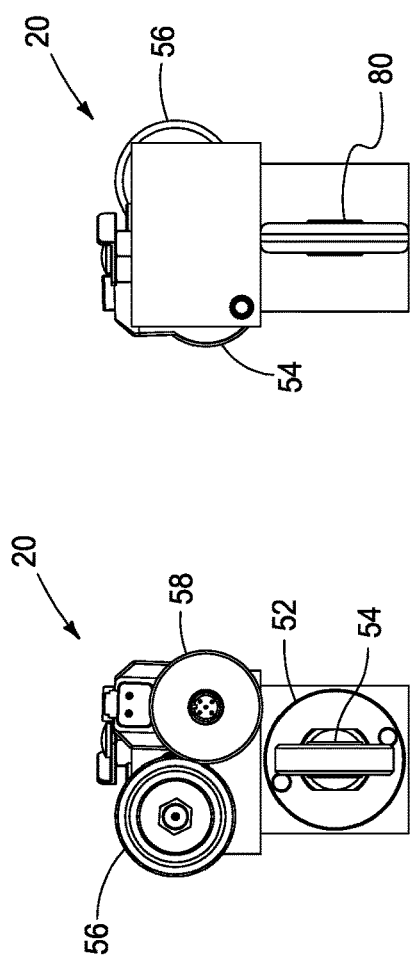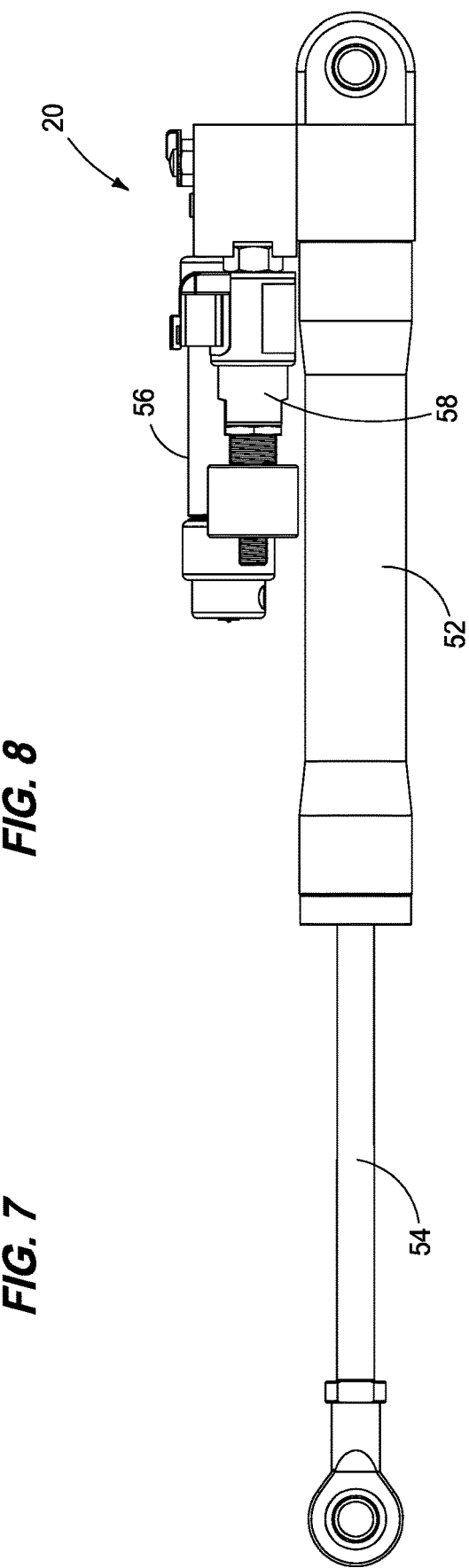
FIG. 8
FIG. 7
FIG. 6

RESTRAINT SYSTEMS AND RESTRAINT SYSTEM METHODS

CROSS REFERENCE TO RELATED APPLICATION

This application claims priority to claims priority to U.S. provisional patent application Ser. No. 62/485,169 which was filed Apr. 13, 2017, entitled "Restraint Systems and Restraint System Methods", the entirety of which is incorporated by reference herein.

TECHNICAL FIELD

The present disclosure relates to restraint systems and restraint system methods. In accordance with example implementations, these systems and methods can be utilized in connection with amusement park rides for example. Accordingly, example amusement park rides can include lap restraints that are operatively coupled to the frame of a car of the ride with a locking cylinder of the present disclosure as well as the locking cylinder in associated monitoring systems of the present disclosure.

BACKGROUND

Restraint systems are becoming increasingly important in amusement rides throughout the country. These restraint systems provide a rider with safety while experiencing varying G-forces about a ride for entertainment purposes. Previously, these restraint systems have taken the form of lap bars that can be pulled into place upon seating of the rider, and then engaged to remain in that place throughout the ride, and then released from that position upon ride completion. Accordingly, typical rides will require a rider to sit in place, pull the lap restraint toward the lap of the rider, and then prior to the ride commencing, a separate attendant will manually walk by each rider and pull the restraint away from the lap, and if the restraint does not move, then that seat is ready to be ridden in. The systems and methods of the present disclosure overcome the shortcomings of these prior art systems.

SUMMARY

Passenger restraint systems are provided. The restraint systems can include: a passenger seat supported by a frame; a restraint bar pivotably attached to the frame; and at least one piston operably engaged between the restraint bar and the frame, the piston moveable between a first position engaging the passenger in the seat and a second position disengaged from the passenger in the seat, wherein the piston comprises a cylinder head housing a pair of check valves.

Amusement ride passenger restraint systems are provided. The systems can include: a passenger seat attached to an amusement ride cart support frame; a restraint bar operable between a first position engaged with the passenger and second position disengaged with the passenger; and at least one piston operably engaged between the restraint bar and the cart support frame, the piston moveable between a first position engaging the passenger in the seat and a second position disengaged from the passenger in the seat, wherein the piston comprises at least one electromechanical valve operable between an open and a closed position.

Restraint system pistons are provided. The pistons can include: a central chamber housing a piston head and rod; a fluid reservoir in fluid communication with the central chamber; and at least one electromechanical valve operable between an open and a closed position.

Methods for restraining a passenger within a seat are also provided. The methods can include: moving a restraint bar in one direction from a disengaged position to an engaged position to restrain a passenger, the restraint bar being unable to proceed opposite the one direction when engaged; and moving the restraint bar opposite the one direction from an engaged position to a disengaged position after opening a valve in a piston operably coupled to the restraint bar.

DRAWINGS

Embodiments of the disclosure are described below with reference to the following accompanying drawings.

FIGS. 5-11 depict example views of a restraint system piston according to embodiments of the disclosure.

DESCRIPTION

Figure 1:
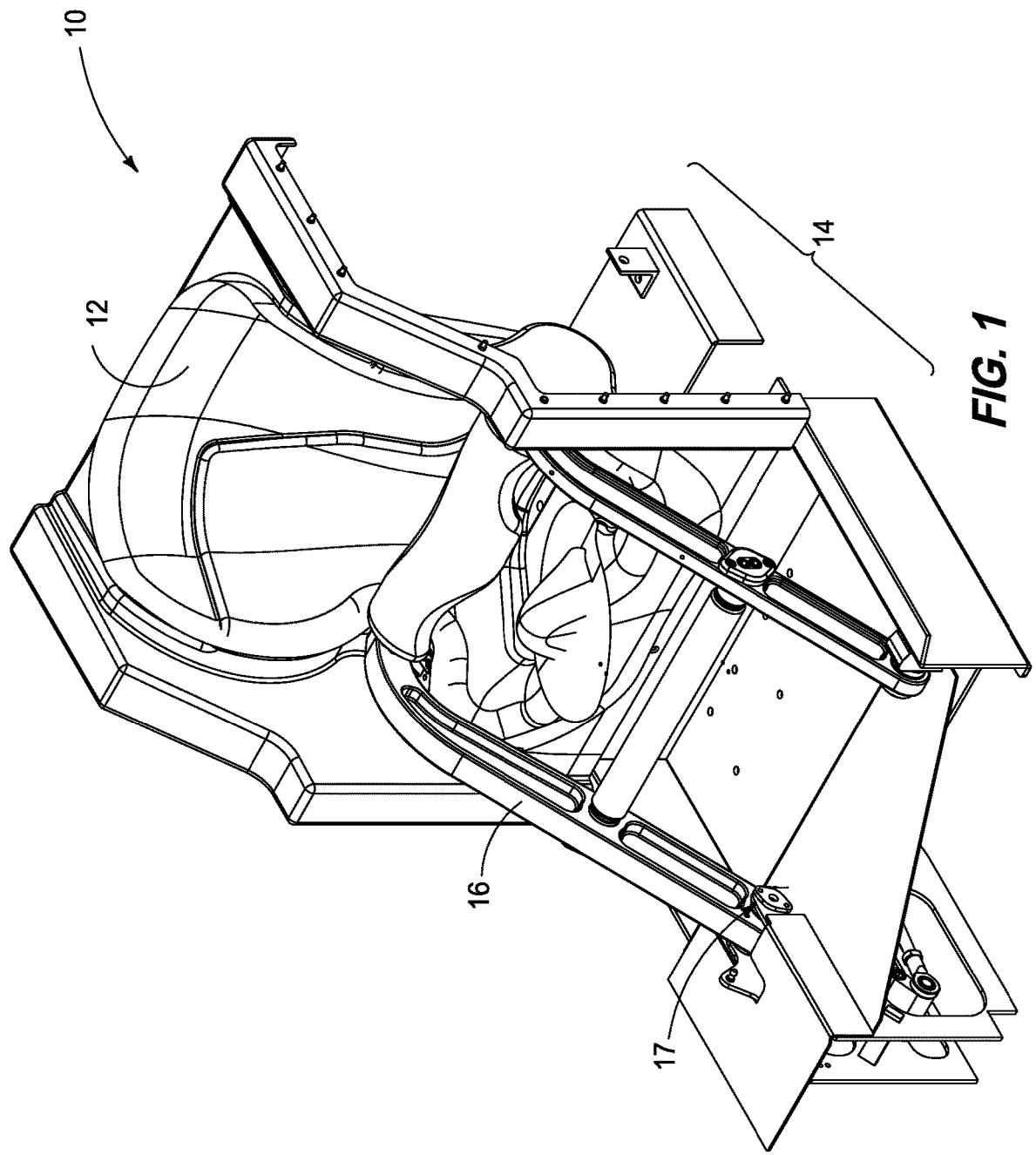
FIGS. 1-4 depict example views of a passenger restraint system according to embodiments of the disclosure.
Figure 2:
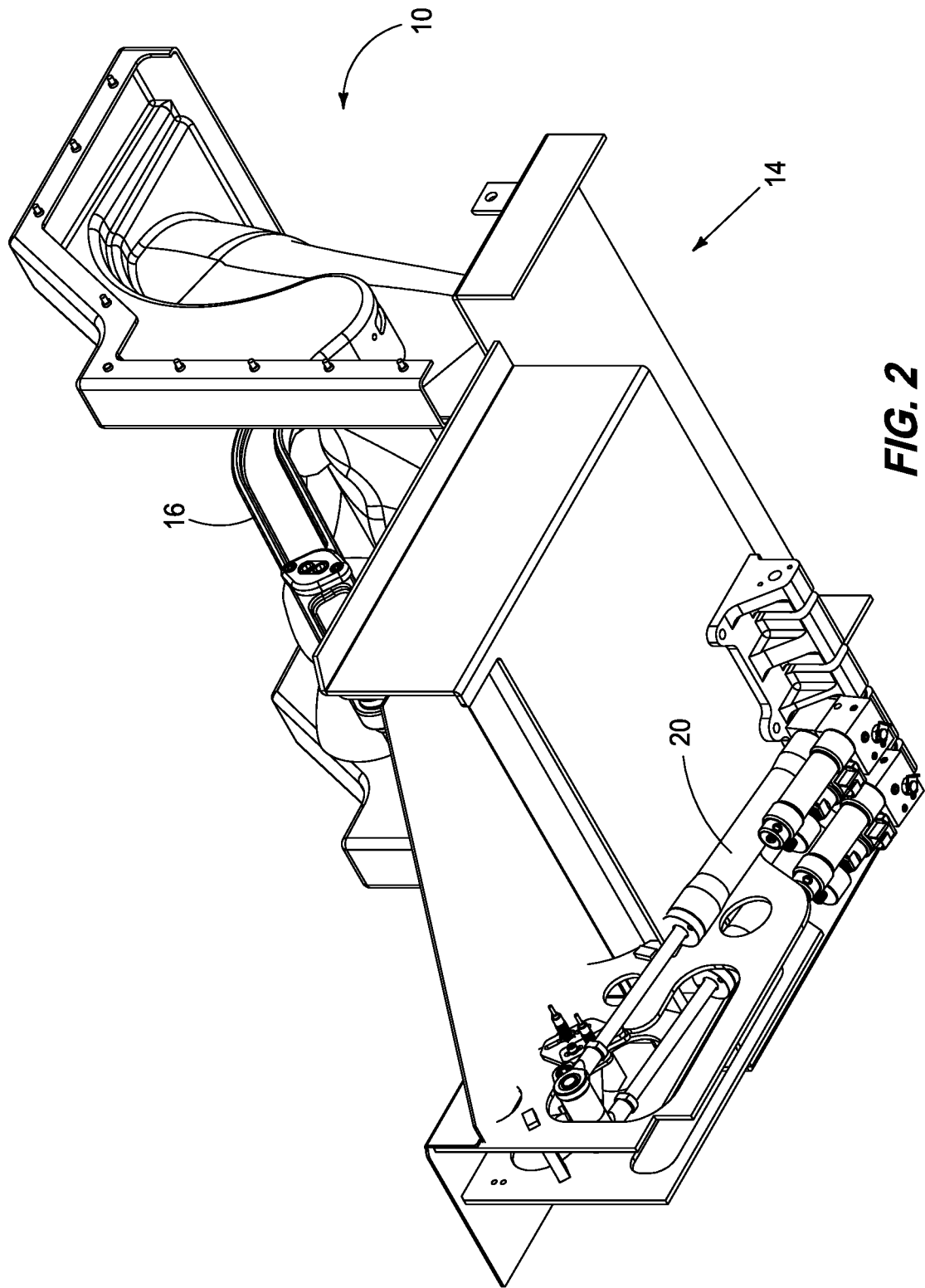
Figure 3:
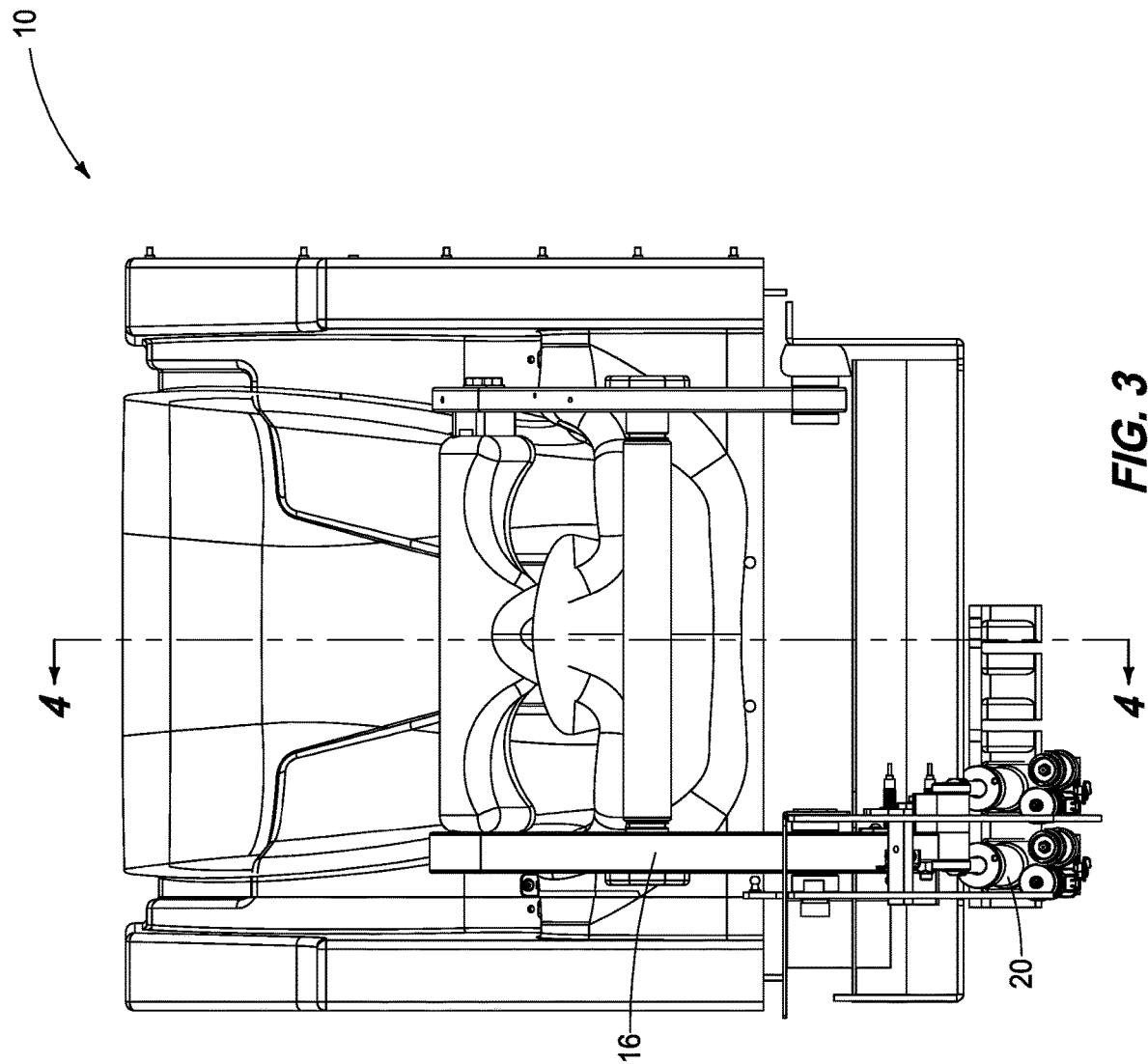
Figure 4:
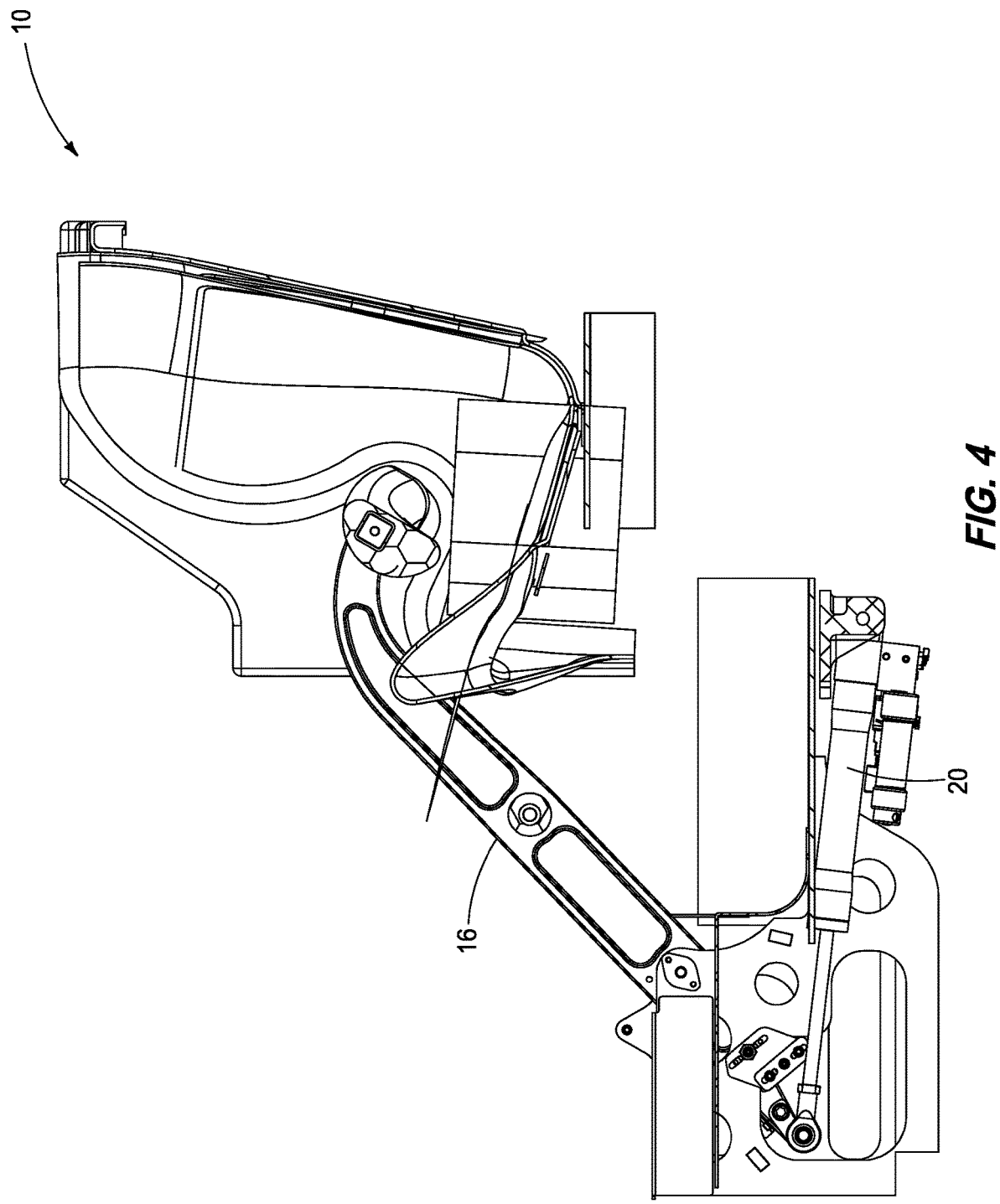
Figure 5:
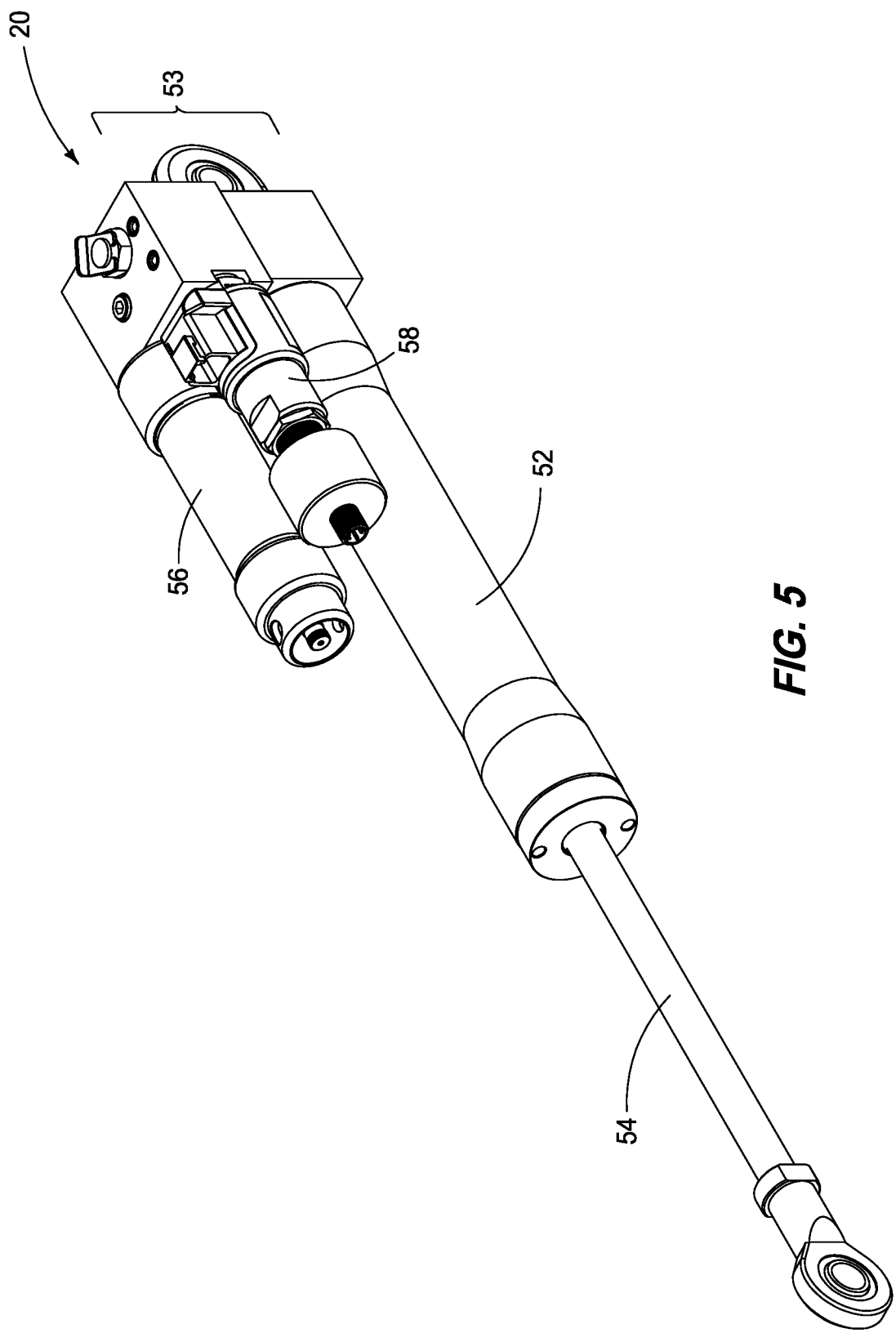
Figure 9:
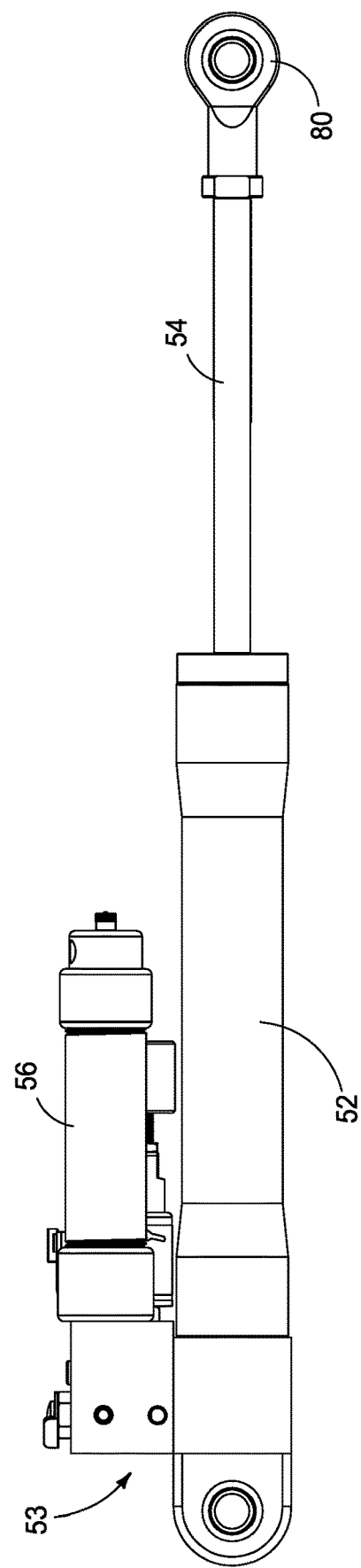
Figure 10:
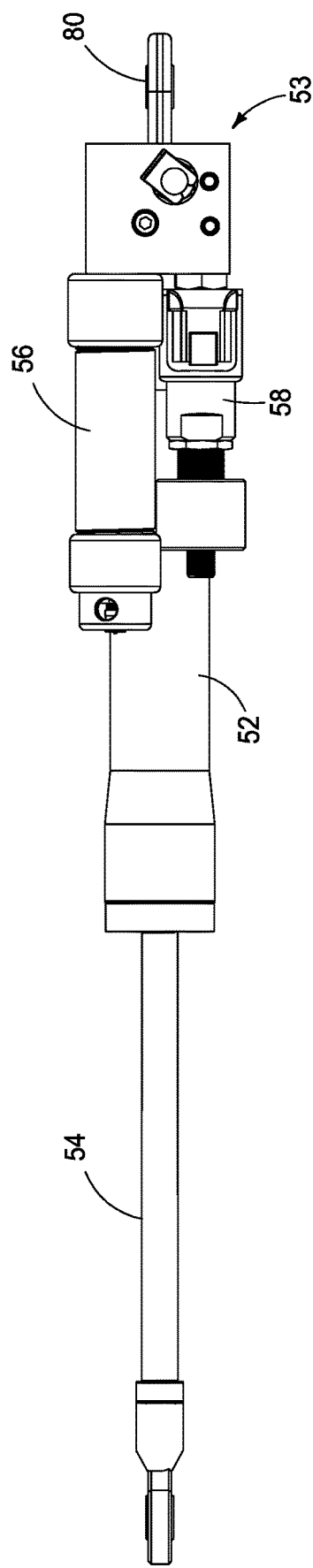
Figure 11:
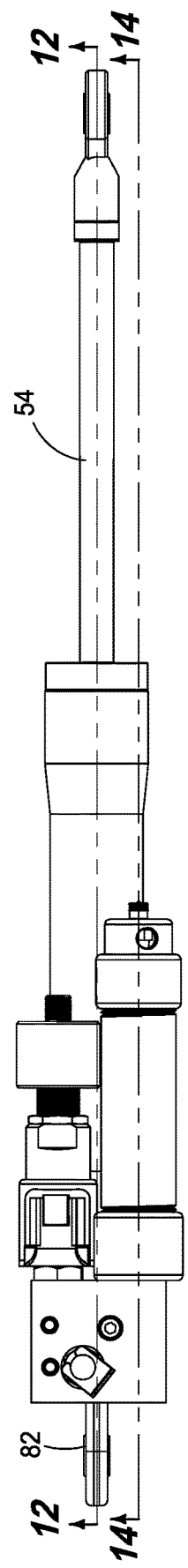
Figure 12:
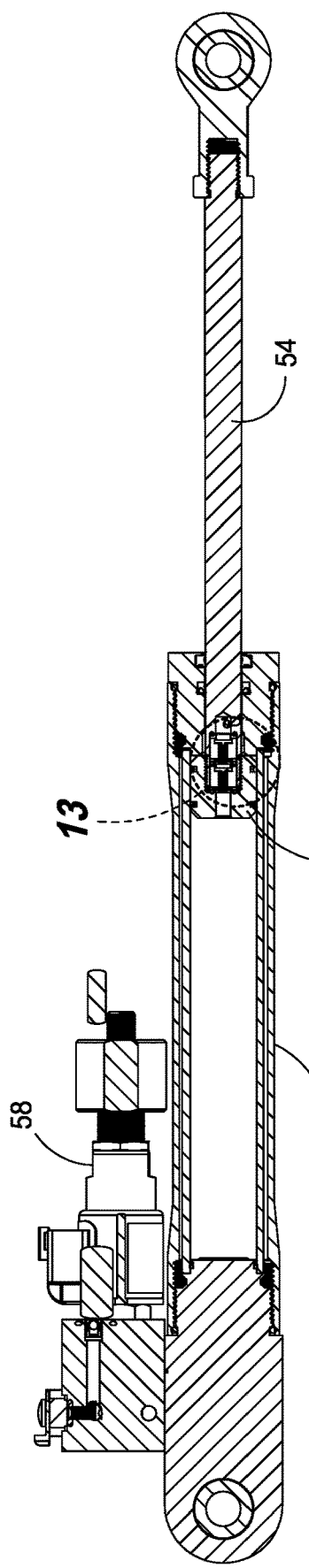
FIGS. 12-15 depict additional example views of the restraint system piston of FIGS. 5-11 according to embodiments of the disclosure.
Figure 13:
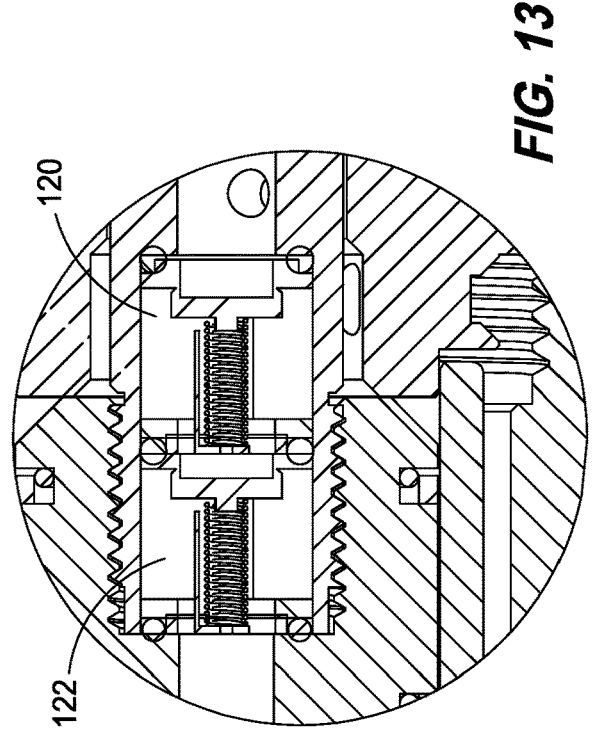
Figure 14:
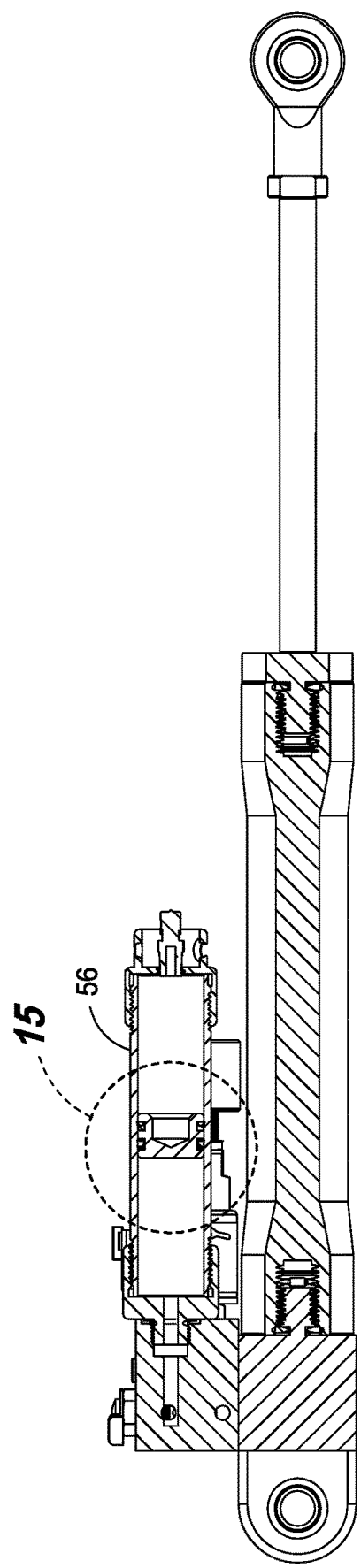
Figure 15:
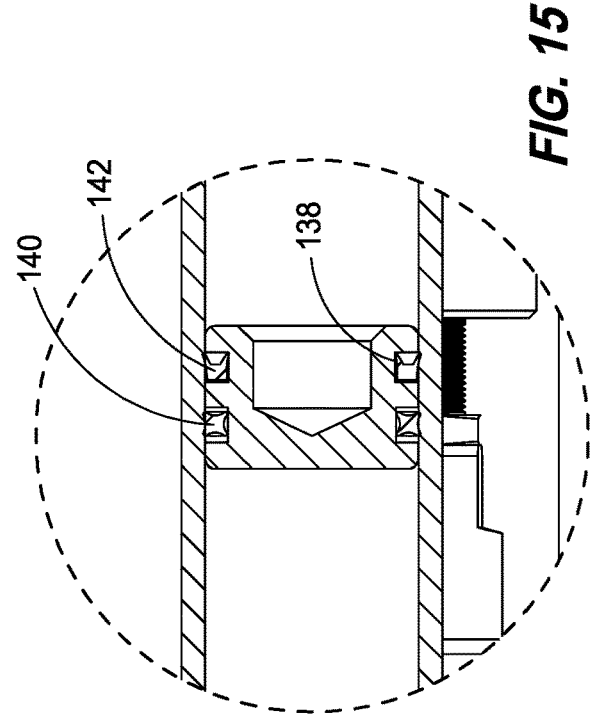
Figure 16:
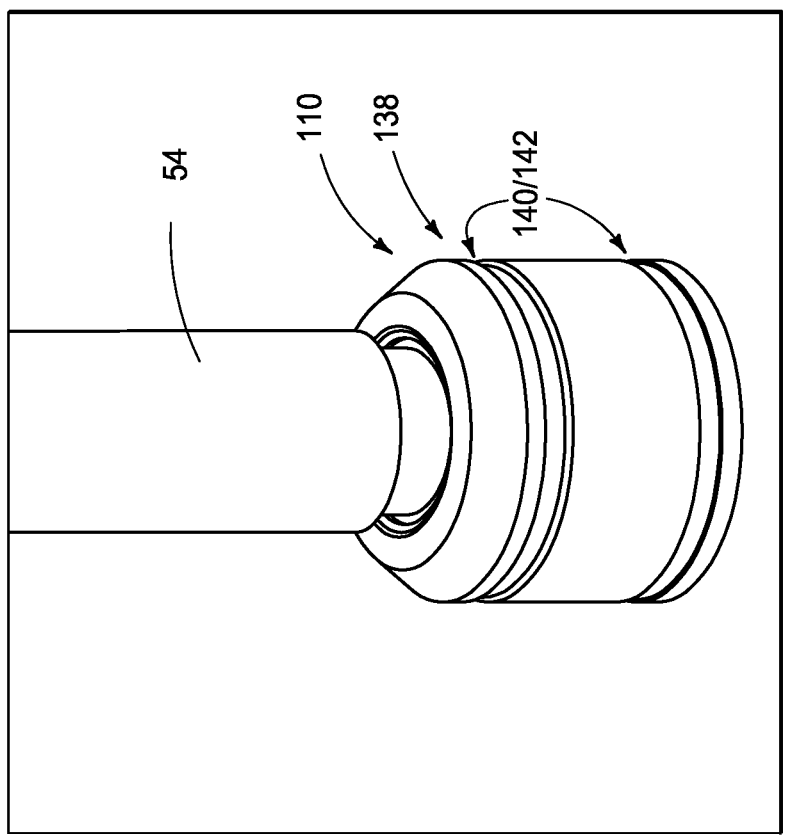
FIGS. 16-18 depict example views of a piston head and rod assembly of the restraint system pistons according to embodiments of the disclosure.
Figure 17:
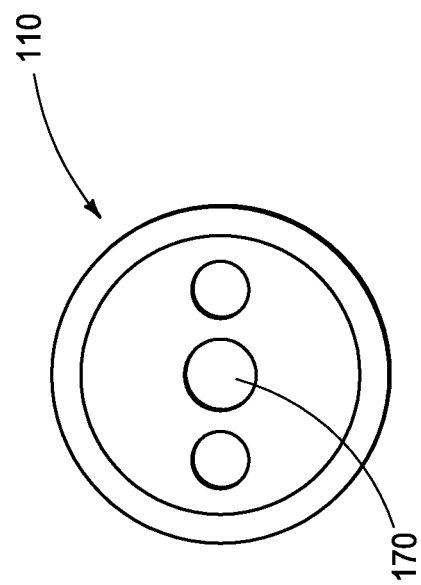
Figure 18:
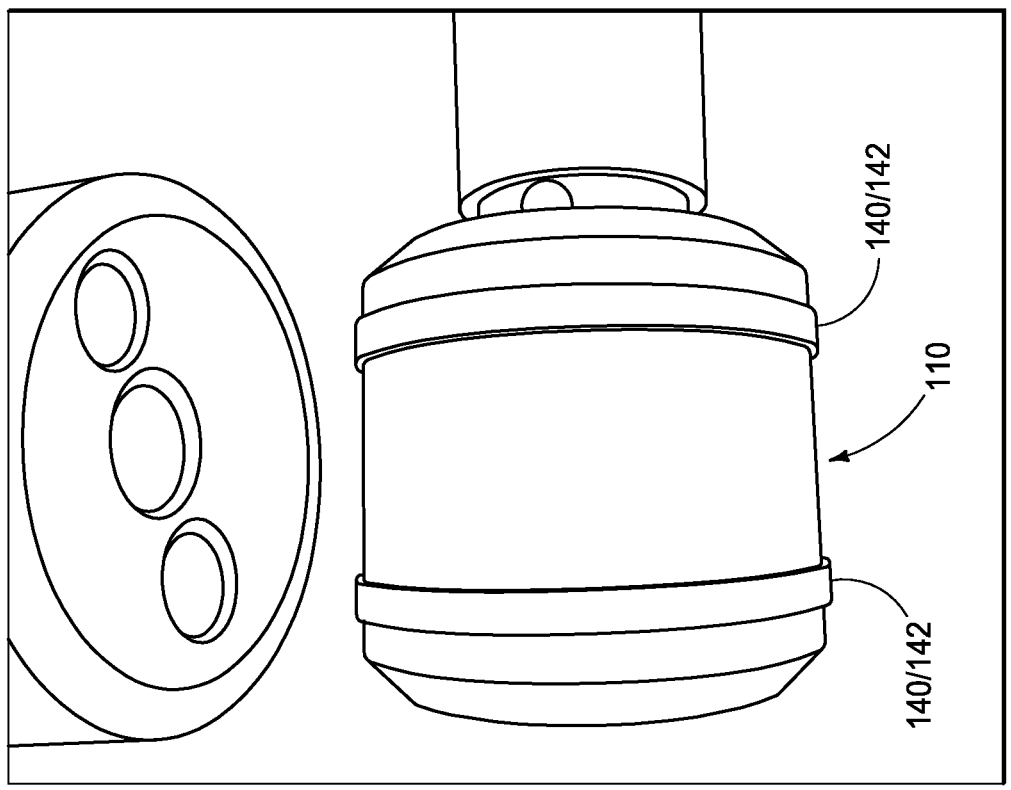
Figure 19:
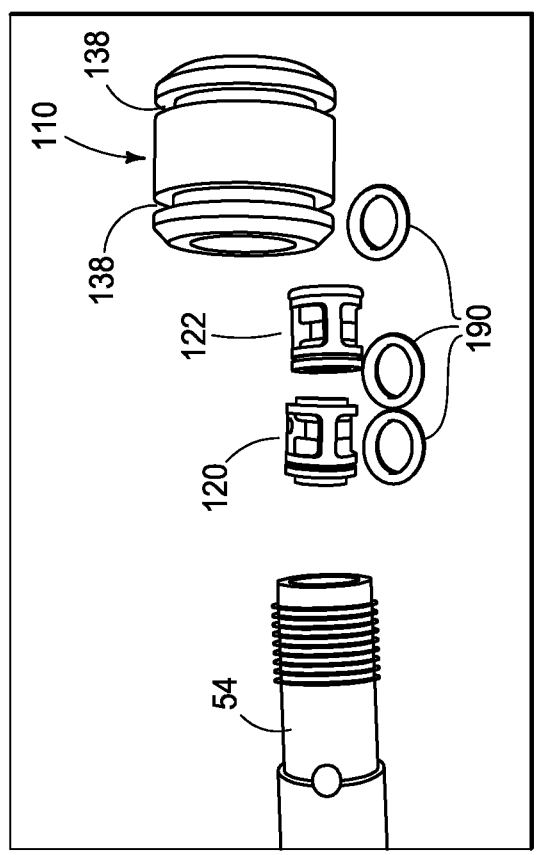
FIGS. 19-20 depict disassembled views of the piston head and rod assembly of FIGS. 16-18 according to embodiments of the disclosure.
Figure 20:
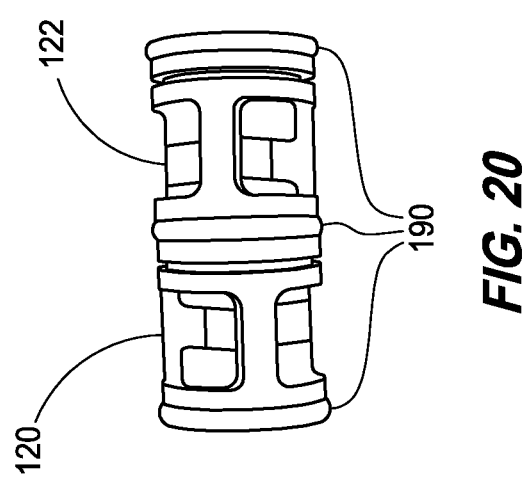

This disclosure is submitted in furtherance of the constitutional purposes of the U.S. Patent Laws "to promote the progress of science and useful arts" (Article 1, Section 8).

The systems and methods of the present disclosure will be described with reference to FIGS. 1-23. Referring first to FIGS. 1-4, views of example restraint systems are shown. In accordance with example implementations, the restraint system 10 can include a passenger seat 12 supported by a frame 14. Frame 14 can be a frame assembly or solid frame for example.

System 10 can include a restraint bar 16 pivotably attached at 17 to frame 14. This can be considered a combination lap bar and a car chassis for example. System 10 can include at least one piston 20; multiple pistons may be used as shown, operably engaged between bar 16 and frame 14. Piston 20 can be moveable between a first position engaging the passenger in seat 12 (as shown without passenger) and a second position disengaged from the passenger in the seat (restraint bar allowing access or egress from seat 12).

The piston can be coupled between a lower end of the restraint bar, which pivots upon a pivot point 17 on the car chassis. In accordance with example implementations, the restraint bar can have two positions and rotate variably between the two positions with a full upright and a locked position. The full upright position allows the rider access to the chair, while the locked position restrains the rider within the chair. As can also be seen, there is a place for two pistons operatively engaged with the restraint bar.

Referring next to FIGS. 5-11, a restraint system piston 20 according to an example implementation is depicted that includes a central chamber 52 that may be considered a main cylinder. Chamber 52 is operatively associated with another chamber 56 such as a fluid reservoir. These two chambers can be operatively engaged via a manifold 53. Manifold 53 can facilitate fluid flow between the chambers as well as provide housing for additional valves that may be electromechanically controlled.

Piston 20 can include a rod 54 operatively engaging chamber 52 as well as coupling end 80 of rod 54. Piston 20 can also include electromechanical valve 58 such as a poppet valve. Piston 20 can have chamber 52 aligned below both valve 58 and chamber 56. Chamber 56 and valve 58 may be aligned in parallel as well. In accordance with example implementations, coupling end 82 may be operatively associated with manifold 53.

Referring next to FIGS. 11-15, more detailed views of piston 20 are shown. For example, piston 20 can include a piston head 110 coupled to rod 54. Head 110 can reside with chamber 52 and be configured to allow fluid flow between portions of chamber 52 separated by head 110. Within head 110 can be a pair of check valves 120 and 122. As can be seen one of the check valves 122 resides within head 110 while the other of the check valves can reside at least partially within rod 54.

Further, chamber 56 can include another head 14 configured to provide positive pressure within chamber 56. Each of these heads can define recesses such as recess 138 configured to receive multiple gaskets 140 and 142. Pairs of gaskets 140 and 142 within the recesses 138 may be constructed of differing materials.

Referring next to FIGS. 16-20, more detailed views of head 110/rod 54 assembly are shown. Terminus of head 110 can include opening 170 to facilitate the flow of fluid through head 110 and between portions of chamber 52. Gaskets 140/142 may reside partially outside recesses 138 when disengaged from chamber 52. Additional gaskets 190 may be provided between check valves 120 and 122 when these check valves are provided in series. The piston head in the main cylinder, the heads themselves can have both a combination of rubber and/or Teflon rings associated therewith which allow the cylinders to slide more freely and be more durable, thereby lasting substantially longer than prior art locking cylinders. The cylinder head is shown with a Teflon and a rubber O-ring. The Teflon O-ring can be supported by a rubber O-ring. The cylinder head may also include two Teflon rings. Both of these Teflon rings can be supported by rubber O-rings.

Figure 21:
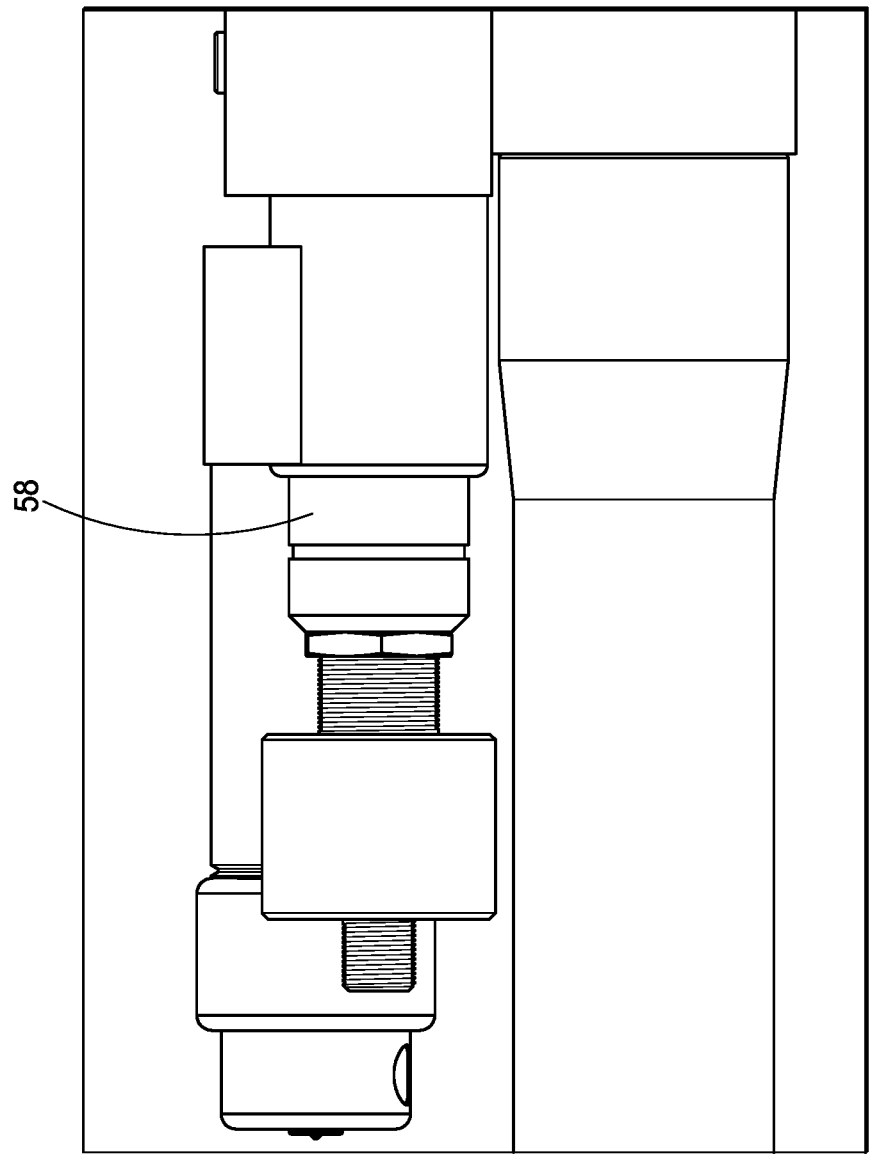
FIGS. 21-23 depict views of an electromechanical valve assembly according to embodiments of the disclosure.
Figure 22:
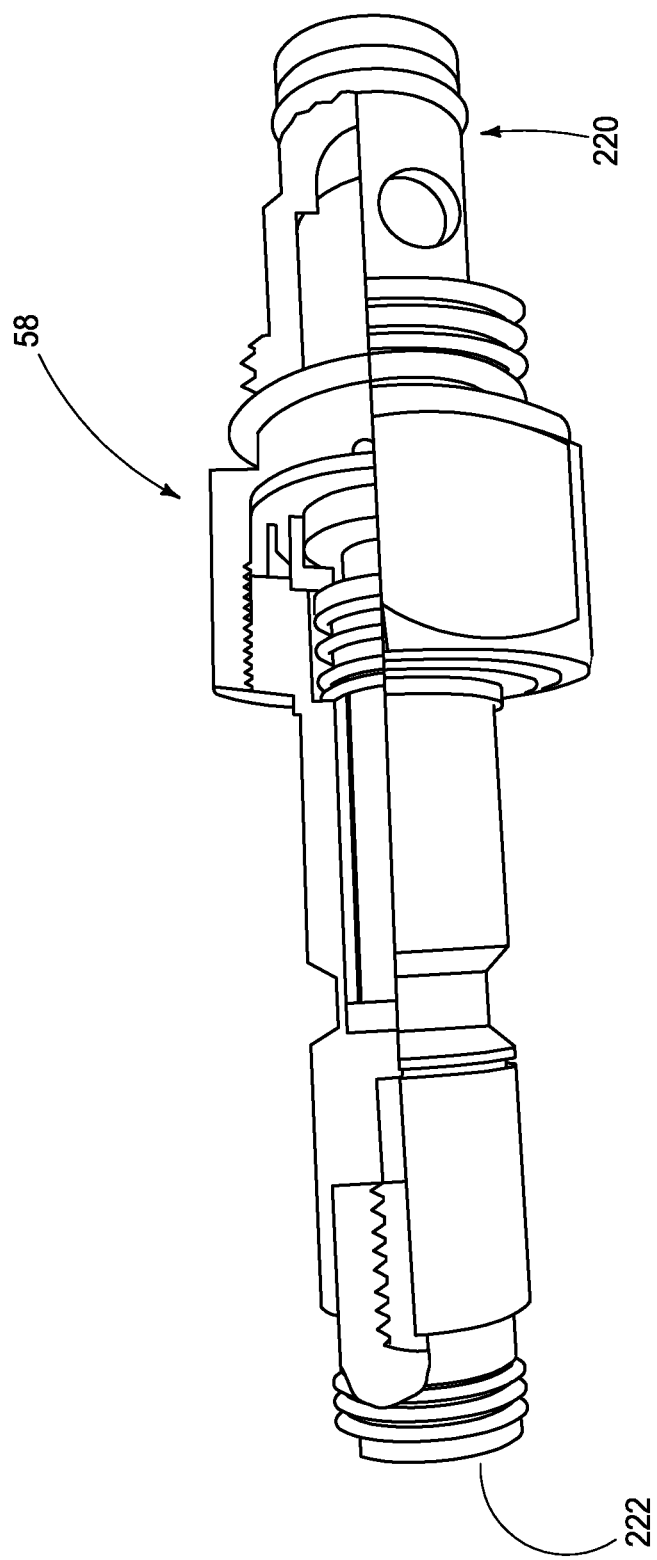
Figure 23:
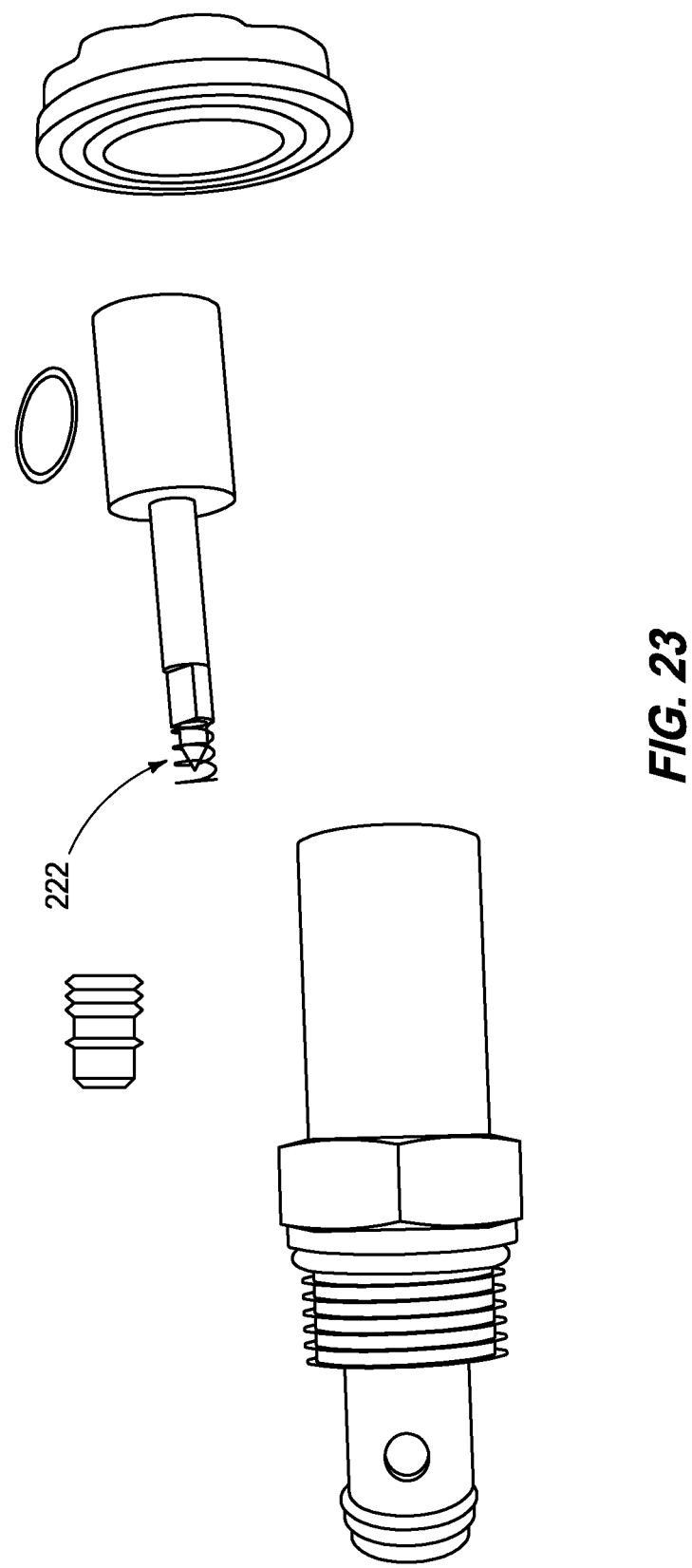

Referring next to FIGS. 21-23, more detailed views of electromechanical valve 58 are shown. In accordance with example implementations, valve 58 can include a valve end 220 that is operatively aligned within the manifold and electronically controlled. Further, valve 58 configured as a poppet valve can include a structure 222 that is mechanically coupled to valve end 220, wherein when valve end 220 is open the structure 222 is in one position in relation to valve 58 and when valve end 220 is closed, structure 222 is in another position. The position of structure 222 can be monitored electronically to verify open/closed configuration of valve end 220.

According to example implementations and methods, as the piston and rod engage the main cylinder, fluid is displaced between opposing sides of the piston head as well as the reservoir cylinder. When fluid is freely exchanged between those three zones within the locking cylinder, the piston can traverse the extent of the main cylinder freely. However, when fluid is restricted between the reservoir and the main cylinder, the piston rod can be locked in place. With the use of operatively aligned check valves, the rod and piston can be restricted from movement in one direction when locked but allowed to move in the opposite direction. In accordance with example implementations, as to prevent fluid from moving in and out of the reservoir, a poppet valve assembly can be de-energized to fix a poppet valve to restrain fluid flow in at least one direction when using a check valve to allow flow in the opposite direction, thereby preventing the piston from moving in at least one direction.

The poppet valve can include an energizer coil that can be used to fix the poppet valve assembly in that one locking position. Accordingly, when the poppet valve assembly is fixed in that one position, fluid can only move in one direction and not in both directions, thereby preventing the piston and rod from moving in at least one direction. In accordance with example implementations, this can be considered the lap bar moving further in the restraining position while being unable to move in the unrestrained position.

In accordance with example implementations, the present disclosure also provides a monitored valve to ensure that the valve is in the engaged position and not in the dis-engaged position. In accordance with example implementations, that can include engaging a mechanical rod to the valve and monitoring the position of that mechanical rod. The monitored poppet valve assembly can include an energizing portion with an industrial electrical plug and a monitoring portion to the left with a 5-pin assembly. The monitoring portion can be associated with a fluid exchange portion that entertains the reservoir piston as well as the main piston.

While recommended sizes are shown and depicted in the accompanying drawings, these should not be considered limiting the scope of this disclosure as the only operable size that will per operable. What should be considered is that the poppet valve is actually monitored to be in the engaged position, which is a first in the industry. In accordance with example implementations, operator houses and amusement rides can now be equipped with panels that can indicate the engaged or dis-engaged position of the poppet valve. In certain circumstances, this can be a double check to an attendant walking the cars and checking to ensure that they are in a locked position prior to engaging the ride. Also, upon use and testing, the ride can be monitored to ensure that the locking valves are engaged and therefore in the locked position. While not depicted in the present application, it is envisioned that a panel can include a representation of a car or multiple cars with individual seats, and each individual seat having an engaged or "go" or "no go" light associated therewith, allowing an operator to review same, and if all are in "go" positions, allowing the ride to proceed, but if only one is a "no go" position, that restraint is checked to make sure it is working properly and if not, that seat is removed from service. This is a substantial increase in the safety of amusement rides worldwide and is the first time that these kinds of precautions have been viewed by an operator remote from the ride itself.

The present disclosure provides increased safety for retaining the restraint system in place by using a modified locking cylinder such as a single locking cylinder that may be used in duplicate for each lap restraint. Therefore, there may be two single locking cylinders.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A method for restraining a passenger within a seat, the method comprising:
   moving a restraint bar in one direction from a disengaged position to an engaged position to restrain a passenger, the restraint bar being unable to proceed opposite the one direction when engaged;
   moving the restraint bar opposite the one direction from an engaged position to a disengaged position after opening a valve in a piston operably coupled to the restraint bar; and
   when moving the restraint bar fluid passes through one or more check valves in series.

2. The method of claim 1 further comprising providing an electronical signal to open the valve.

3. The method of claim 1 further comprising sensing the presence of an object associated with the valve to determine the position, open or closed, of the valve.

4. A method for restraining a passenger within a seat, the method comprising:
   moving a restraint bar in one direction from a disengaged position to an engaged position to restrain a passenger, the restraint bar being unable to proceed opposite the one direction when engaged;
   moving the restraint bar opposite the one direction from an engaged position to a disengaged position after opening a valve in a piston operably coupled to the restraint bar; and
   passing fluid through a rod head of the piston to the one or more check valves.

5. The method of claim 4 further comprising slidably engaging the rod head with a piston chamber via a pair of gaskets.

6. A method for restraining a passenger within a seat, the method comprising:
   moving a restraint bar in one direction from a disengaged position to an engaged position to restrain a passenger, the restraint bar being unable to proceed opposite the one direction when engaged;
   moving the restraint bar opposite the one direction from an engaged position to a disengaged position after opening a valve in a piston operably coupled to the restraint bar;
   passing fluid through a fluid reservoir operably coupled to the piston;
   providing positive pressure within the fluid reservoir with a head slidably engaged within the reservoir; and
   engaging the head with gaskets to the interior of the reservoir.

7. The method of claim 1 further comprising opening another valve in another piston operably coupled to the restraint bar.

* * * * *

UNITED STATES PATENT AND TRADEMARK OFFICE
CERTIFICATE OF CORRECTION

PATENT NO. : 11,007,960 B1  
APPLICATION NO. : 15/916094  
DATED : May 18, 2021  
INVENTOR(S) : Mike Syrcle and Eric Wellington Page 1 of 1

It is certified that error appears in the above-identified patent and that said Letters Patent is hereby corrected as shown below:

In the Specification

Column 1, Line 7 – Replace "claims priority to claims priority to U.S." with --claims priority to U.S.--

Column 3, Line 16 – Replace "can reside with" with --can reside within--

Column 4, Line 33 – Replace "will per operable" with --will be operable--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*